United States Patent
Yang et al.

(10) Patent No.: US 10,295,368 B2
(45) Date of Patent: May 21, 2019

(54) DATA COLLECTION METHOD, APPARATUS, AND SYSTEM

(71) Applicant: Huawei Technologies Co., Ltd., Shenzhen (CN)

(72) Inventors: Dachao Yang, Nanjing (CN); Haiyuan Zhan, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/695,465

(22) Filed: Sep. 5, 2017

(65) Prior Publication Data
US 2018/0066962 A1    Mar. 8, 2018

(30) Foreign Application Priority Data

Sep. 5, 2016 (CN) .......................... 2016 1 0802193

(51) Int. Cl.
| | |
|---|---|
| *H04M 11/04* | (2006.01) |
| *H04M 3/42* | (2006.01) |
| *G01D 4/00* | (2006.01) |
| *G06F 17/30* | (2006.01) |
| *H04L 29/08* | (2006.01) |

(Continued)

(52) U.S. Cl.
CPC ....... *G01D 4/004* (2013.01); *G06F 17/30477* (2013.01); *H04L 67/04* (2013.01); *H04Q 9/00* (2013.01); *G06Q 50/06* (2013.01); *H04Q 2209/60* (2013.01)

(58) Field of Classification Search
None
See application file for complete search history.

(56) References Cited

U.S. PATENT DOCUMENTS

| | | | | |
|---|---|---|---|---|
| 2015/0088442 A1* | 3/2015 | Farrar | ............... | G01R 21/1333 |
| | | | | 702/62 |
| 2016/0282139 A1* | 9/2016 | Girdhar | ............... | G01R 21/133 |

FOREIGN PATENT DOCUMENTS

| | | |
|---|---|---|
| EP | 2566125 A1 | 3/2013 |
| EP | 2597911 A1 | 5/2013 |

OTHER PUBLICATIONS

Kmethy, "IEC 62056 DLMS/COSEM—a short overview," ETSI M2M Meeting, XP014154053, European Telecommunications Standards Institute (ETSI), Sophia Antipolis, France (Sep. 10, 2009).

(Continued)

*Primary Examiner* — Erika A Washington
(74) *Attorney, Agent, or Firm* — Leydig, Voit & Mayer, Ltd.

(57) ABSTRACT

A data collection method performed by a collector for communicating with a master station by using DLMS protocol, includes: obtaining a collected-data item identifier from the master station, where the collected-data item identifier indicates a collected data item that needs to be reported to the master station in an event reporting manner; obtaining from a smart meter, to-be-reported data corresponding to the collected-data item identifier; generating a DLMS extension event packet, where the DLMS extension event packet includes a data attribute item and the to-be-reported data, and the data attribute item is used to identify a type of the to-be-reported data; and sending the DLMS extension event packet to the master station. Therefore, message exchange between the master station and the collector and occupied resources can be reduced, and data collection performance can be improved.

12 Claims, 5 Drawing Sheets

(51) Int. Cl.
*H04Q 9/00* (2006.01)
*G06Q 50/06* (2012.01)

(56) References Cited

OTHER PUBLICATIONS

"Electricity metering data exchange—The DLMS/COSEM suite—Part 6-1: Object Identification System (OBIS)," Edition 2.0, XP082009642, pp. i-88, International Standard (Nov. 19, 2015).

* cited by examiner

DATA COLLECTION METHOD, APPARATUS, AND SYSTEM

CROSS-REFERENCE TO RELATED APPLICATION

This application claims priority to Chinese Patent Application No. 201610802193.1, filed on Sep. 5, 2016, which is hereby incorporated by reference in its entirety.

TECHNICAL FIELD

The present invention relates to the field of data collection, and specifically, to a data collection method, apparatus, and system.

BACKGROUND

The Distribution Line Message Specification (DLMS) is an international standard protocol for communication in the power industry. A smart meter reading system based on the DLMS generally includes a master station, a collector, and a smart meter. The smart meter is, for example, an electricity meter, a water meter, a gas meter, or the like.

In a conventional smart meter reading system, in an example in which electricity meter data is collected, before collecting the electricity meter data, a master station needs to first establish a connection to an electricity meter; to collect data from n electricity meters connected to a collector, the master station needs to establish at least n connections. In this way, many connections are established between the master station and the collector. If a persistent connection is used, many resources need to be consumed to maintain the connections between the master station and the collector. If a short connection is used, the master station and the collector need to frequently establish a connection. Therefore, message exchange is increased, and overall collection performance is affected. For an electricity meter data item that needs to be frequently collected, many connections need to be established between the master station and the collector. Consequently, many resources of the master station and the collector are consumed, and performance of an entire meter reading system is reduced.

SUMMARY

In view of the foregoing problems, this application provides a data collection method, a data collection apparatus, a data collector, and a data collection system, so as to reduce message exchange between a master station and a collector and occupied resources, and improve data collection performance.

According to a first aspect, a data collection method is provided. The method is applied to a collector that communicates with a master station by using the Distribution Line Message Specification (DLMS) protocol, and includes: The collector obtains a collected-data item identifier from the master station, where the collected-data item identifier indicates a collected data item that needs to be reported to the master station in an event reporting manner; the collector obtains, from a smart meter, to-be-reported data corresponding to the collected-data item identifier; the collector generates a DLMS extension event packet, where the DLMS extension event packet includes a data attribute item and the to-be-reported data, and the data attribute item is used to identify a type of the to-be-reported data; and the collector sends the DLMS extension event packet to the master station. The collected data item may be a non-real-time reported data item.

According to the data collection method of the first aspect, a master station delivers a collected-data item identifier to a collector, and the collector reports, in an event reporting manner, to-be-reported data that is obtained from a smart meter and that corresponds to the collected-data item identifier. The master station does not need to send, by using the collector, an instruction to a smart meter to establish a connection for each operation of each smart meter. In this way, connection message exchange between the master station and the collector in a data collection process can be reduced, resources required for connection maintenance can be reduced, and data collection performance can be improved.

In some embodiments, the data attribute item includes one or more groups of attribute information, and the attribute information is attribute information defined in a DLMS standard.

In some embodiments, the DLMS extension event packet further includes a reporting confirmation instruction, and the reporting confirmation instruction is used to instruct the master station to feed back a confirmation message after successfully receiving the to-be-reported data. In this way, it can be ensured that the master station reliably receives the to-be-reported data corresponding to the collected-data item identifier.

In some embodiments, the DLMS extension event packet further includes identification information of a smart meter, and the identification information of the smart meter indicates a smart meter that reports the to-be-reported data. In this way, a smart meter from which data is transmitted can be easily confirmed.

In some embodiments, the DLMS extension event packet further includes a quantity of groups of attribute information. In this way, the master station can easily read a data attribute item.

In some embodiments, the collector actively establishes a connection to the master station when sending the DLMS extension event packet to the master station.

In some embodiments, the connection established by the collector to the master station is a persistent connection, and the collector sends multiple DLMS extension event packets to the master station in the persistent connection. In this way, a quantity of times of establishing a connection between the master station and the collector in a data collection process can further be reduced, occupied resources can be reduced, and data collection performance can be improved.

According to a second aspect, a data collection apparatus is provided. The apparatus communicates with a master station by using the Distribution Line Message Specification (DLMS) protocol, and includes: a first receiving unit configured to obtain a collected-data item identifier from the master station, where the collected-data item identifier indicates a collected data item that needs to be reported to the master station in an event reporting manner; a second receiving unit configured to obtain, from a smart meter, to-be-reported data corresponding to the collected-data item identifier; a data generation unit configured to generate a DLMS extension event packet, where the DLMS extension event packet includes a data attribute item and the to-be-reported data, and the data attribute item is used to identify a type of the to-be-reported data; and a sending unit configured to send the DLMS extension event packet to the master station. The collected data item may be a non-real-time reported data item.

According to the data collection apparatus of the second aspect, a collected-data item identifier delivered by a master station is received, so that to-be-reported data that is obtained from a smart meter and that corresponds to the collected-data item identifier is reported in an event reporting manner. In this way, connection message exchange between the master station and the data collection apparatus in a data collection process can be reduced, resources required for connection maintenance can be reduced, and data collection performance can be improved.

In some embodiments, the data attribute item includes one or more groups of attribute information, and the attribute information is attribute information defined in a DLMS standard.

In some embodiments, the DLMS extension event packet further includes a reporting confirmation instruction, and the reporting confirmation instruction is used to instruct the master station to feed back a confirmation message after successfully receiving the to-be-reported data. In this way, it can be ensured that the master station reliably receives the to-be-reported data corresponding to the collected-data item identifier.

In some embodiments, the DLMS extension event packet further includes identification information of a smart meter, and the identification information of the smart meter indicates a smart meter that reports the to-be-reported data. In this way, a smart meter from which data is transmitted can be easily confirmed.

In some embodiments, the DLMS extension event packet further includes a quantity of groups of attribute information. In this way, the master station can easily read a data attribute item.

In some embodiments, the sending unit actively establishes a connection to the master station when sending the DLMS extension event packet to the master station.

In some embodiments, the connection established by a collector to the master station is a persistent connection, and the collector sends multiple DLMS extension event packets to the master station in the persistent connection. In this way, a quantity of times of establishing a connection between the master station and the collector in a data collection process can be reduced, occupied resources can be reduced, and data collection performance can be improved.

According to a third aspect, a data collector is provided. The data collector communicates with a master station by using the Distribution Line Message Specification (DLMS) protocol, and includes a processor and a memory configured to store an executable instruction of the processor. The processor is configured to execute the method according to the first aspect.

According to a fourth aspect, a data collection system is provided. The data collection system includes the data collector according to the third aspect and a master station, where the master station sends a collected-data item identifier to the data collector.

According to a fifth aspect, a storage medium is provided. The storage medium is configured to store a computer program, and when the computer program is executed by a processor, the processor implements the method according to the first aspect.

According to the foregoing solutions, connection message exchange between a master station and a collector in a data collection process can be reduced, resources required for connection maintenance can be reduced, and data collection performance can be improved.

BRIEF DESCRIPTION OF DRAWINGS

To describe technical solutions in embodiments of the present invention more clearly, the following briefly describes the accompanying drawings for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

To make purposes, technical solutions, and advantages of embodiments of the present invention clearer, the following describes technical solutions of embodiments of the present invention with reference to the accompanying drawings in the embodiments of the present invention. The described embodiments are some rather than all of the embodiments of the present invention. All other embodiments obtained by a person of ordinary skill in the art based on the embodiments of the present invention without creative efforts shall fall within the protection scope of the present invention.

For ease of description of the technical solutions of the present invention, an example in which a smart meter is an electricity meter is used in the following embodiments, and does not constitute a limitation of the present invention. Certainly, technical solutions of the present invention are also applicable to another smart meter such as a water meter or a gas meter.

Figure 1:
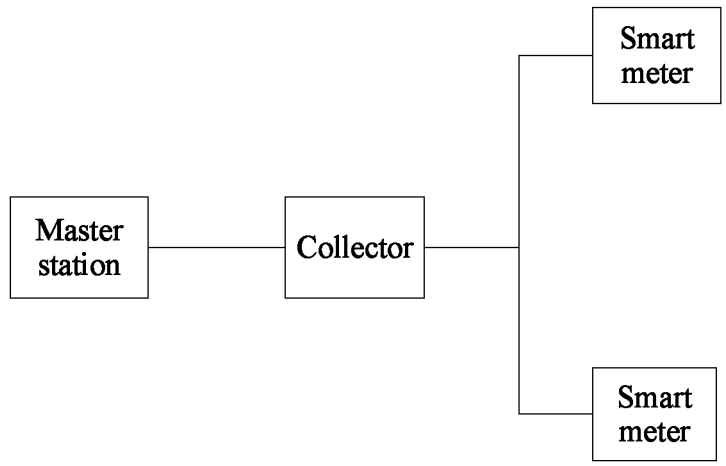
FIG. 1 is a schematic structural diagram of a data collection system according to an embodiment of the present invention.

FIG. 1 is a schematic structural diagram of a data collection system according to an embodiment of the present invention. As shown in FIG. 1, the data collection system includes a master station, a collector, and a smart meter. There may be one or more smart meters. The master station collects data from the smart meter by using the collector, manages the collected data, sends a parameter setting instruction to the smart meter, and so on.

The master station and the collector communicate with each other based on the DLMS protocol. Both the master station and the collector may send a connection establishment request to each other, and may respond to the request. For example, the collector may send a connection establishment request to the master station to establish a connection, and the master station may also send a connection establishment request to the collector to establish a connection. In this way, data receiving and sending between the master station and the collector are implemented.

The collector and the smart meter may communicate with each other based on the DLMS protocol or in another manner, for example, based on the RS (Recommended Standard)-485 protocol. The present invention sets no limitation thereto.

A data collection method according to an embodiment of the present invention is described below based on the data collection system in FIG. 1.

Figure 2:
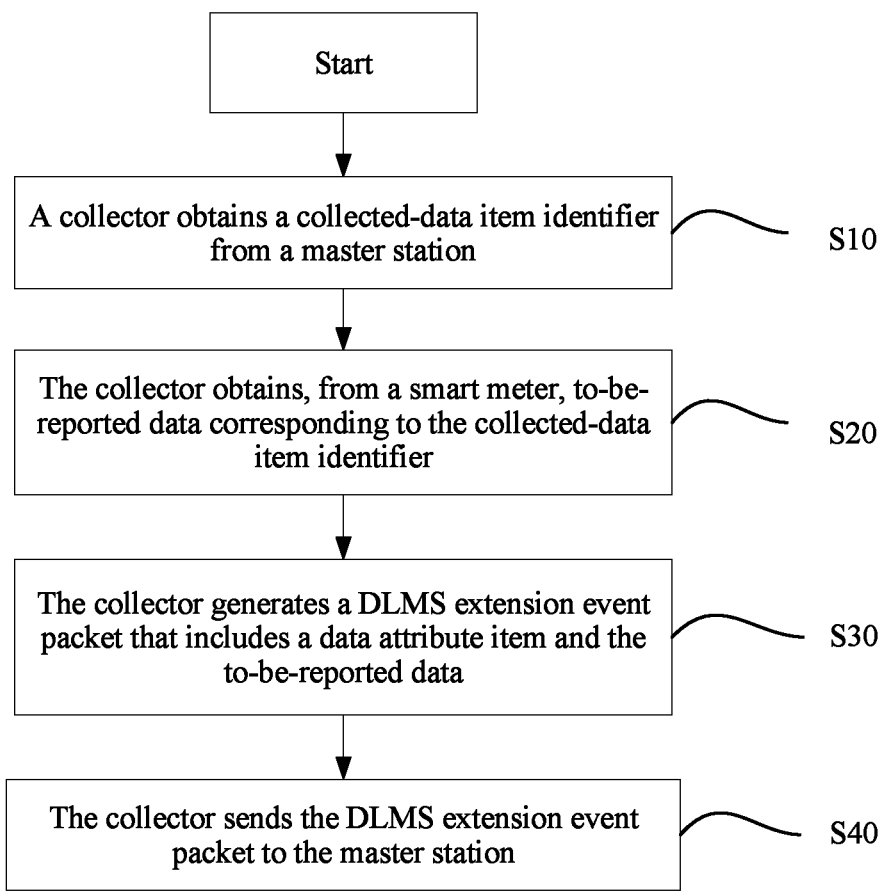
FIG. 2 is a schematic flowchart of a data collection method according to an embodiment of the present invention.

FIG. 2 is a schematic flowchart of a data collection method according to an embodiment of the present invention. The method is applied to a collector that communicates with a master station by using the Distribution Line Message Specification (DLMS) protocol. As shown in FIG. 2, the method includes the following steps S10 to S40.

Step S10: The collector obtains a collected-data item identifier from the master station, where the collected-data item identifier indicates a collected data item that needs to be reported to the master station in an event reporting manner.

The collected data item indicated by the collected-data item identifier is a non-real-time reported data item. The non-real-time reported data item is a collected data item that the master station does not need to collect from a smart meter in real time. For example, in an example in which the smart meter is an electricity meter, a non-real-time reported data item that the master station needs to collect from the smart meter may be total active power, a historical power on/off record, daily frozen total positive active energy, monthly frozen total positive active energy, or the like.

Step S20: The collector obtains, from a smart meter, to-be-reported data corresponding to the collected-data item identifier.

For example, the collector may obtain any one or more of the following data from the smart meter: data of total active power, data of a historical power on/off record, data of daily frozen total positive active energy, or data of monthly frozen total positive active energy.

Step S30: The collector generates a DLMS extension event packet, where the extension event packet includes a data attribute item and the to-be-reported data, and the data attribute item is used to identify a type of the to-be-reported data.

Step S40: The collector sends the DLMS extension event packet to the master station.

Before step S10, the method may further include: establishing, by the master station, a connection to the collector. Specifically, the master station sends a connection establishment request to the collector, the collector responds to the connection establishment request, and the master station establishes the connection to the collector. Then, the master station sends the collected-data item identifier to the collector. After the collector obtains the collected-data item identifier, the connection between the master station and the collector is broken.

In a conventional smart meter reading system, an event generally refers to information such as a fault or an alarm that is actively reported by an electricity meter, and for example, may be overcurrent, meter cover opening, constant magnetic field interference, or electricity meter resetting. The collector may report different events in different manners according to alarm severities of the events. A higher alarm severity leads to a stricter real-time requirement. The foregoing description is only an example of an event reporting manner, and does not constitute a limitation.

In the DLMS protocol, event reporting corresponds to an event notification (EventNotification) service. Usually, the master station initiates a request to collect electricity meter data, and the collector responds to the request of the master station. However, in the Companion Specification for Energy Metering (COSEM), event reporting is performed by the collector. When performing event reporting, the collector specifically invokes an event notification request (EventNotification.request) service in the DLMS protocol. An application layer of a COSEM server constructs an application protocol data unit (APDU) of the event notification request service, and the APDU reports an event to the master station in a non-request manner by using an underlying data communication service.

Figure 3:
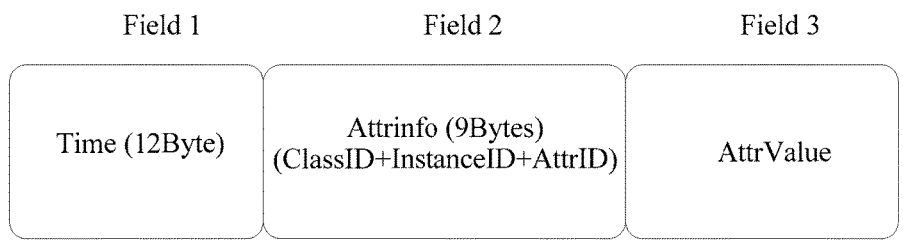
FIG. 3 is a schematic diagram of a format of a DLMS standard event packet.

FIG. 3 is a schematic diagram of a format of a DLMS standard event packet. As shown in FIG. 3, a standard DLMS event packet includes three fields: a field 1: a time (Time), a field 2: attribute information (AttrInfo), and a field 3: an attribute value (AttrValue).

The time (Time) describes a time at which an event occurs. The attribute information (AttrInfo) is used to describe an attribute of an event, and indicates an event that has occurred. The attribute value (AttrValue) includes specific information of an event. The attribute information includes a class indicator (ClassID, also referred to as a class ID), an instance indicator (InstanceID, also referred to as an instance ID), and an attribute indicator (AttrID, also referred to as an attribute ID). The class ID indicates a type of an instance interface class of the attribute. The instance ID describes a meaning of an instance. For the attribute ID, each instance has multiple attributes, and each attribute is identified by an attribute ID.

According to the method provided in this embodiment of the present invention, a collector sends some electricity meter data to a master station in an event reporting manner. Details are described below.

Figure 4:
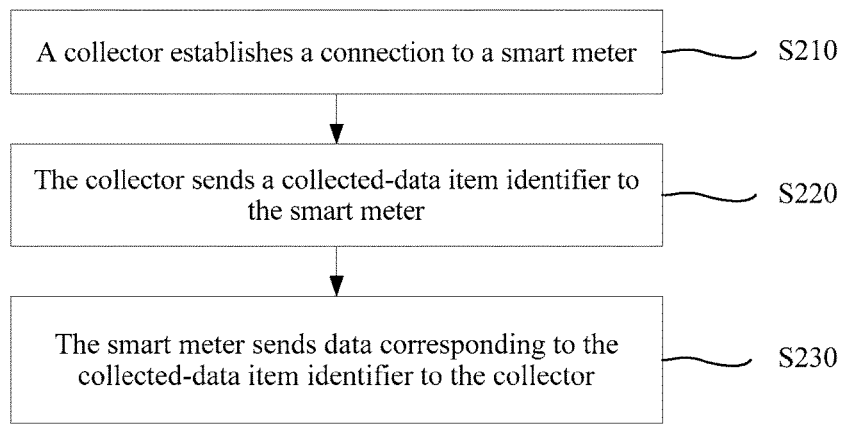
FIG. 4 is a schematic flowchart of obtaining smart meter data by a collector according to an embodiment of the present invention.

Optionally, as shown in FIG. 4, an embodiment of obtaining, by the collector from the smart meter, the to-be-reported data corresponding to the foregoing collected-data item identifier includes the following steps:

Step S210: The collector establishes a connection to the smart meter.

Step S220: The collector sends the collected-data item identifier to the smart meter.

Step S230: The smart meter sends data corresponding to the collected-data item identifier to the collector.

Certainly, the smart meter may also report, in an event reporting manner, the data corresponding to the collected-data item identifier to the collector. In this way, the smart meter needs to support the DLMS protocol. A manner in which the collector obtains, from the smart meter, the data corresponding to the collected-data item identifier is not specifically limited in the present invention, and may be any implementable manner.

Figure 5:
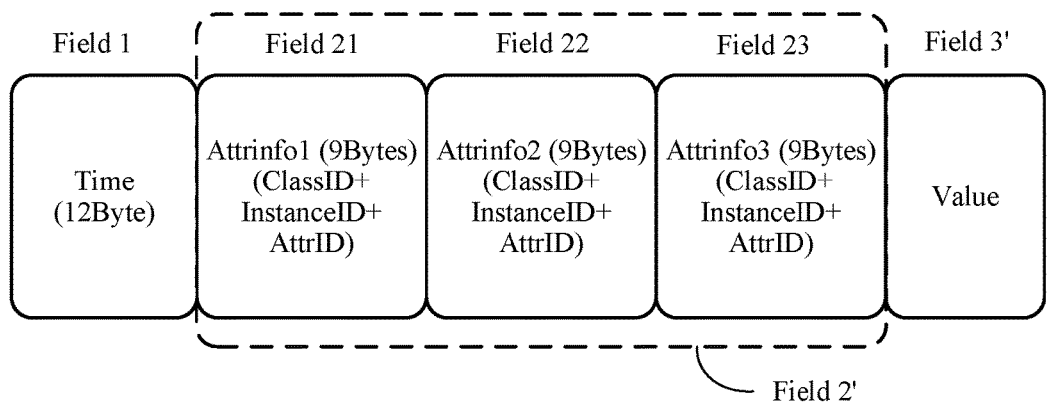
FIG. 5 is a schematic diagram of a format of a DLMS extension event packet according to an embodiment of the present invention.

FIG. 5 is a schematic diagram of a format of a DLMS extension event packet according to an embodiment of the present invention. A DLMS extension event packet is obtained by extending the foregoing DLMS standard event packet. A field 1 is a time that is used to describe a time for collecting data. A field 2' is a data attribute item that is used to describe a collected data item, that is, describe a type of the foregoing to-be-reported data. Some collected data items need to be described by using one group of attribute information, and some collected data items need to be described by using multiple groups of attribute information. That is, the data attribute item may include one or more groups of attribute information. A field 3' includes to-be-reported data corresponding to a collected-data item identifier. Herein, the to-be-reported data may include data information and time information. When data corresponding to the collected-data item identifier is only one piece of data, the to-be-reported data may include only the data information. When the data corresponding to the collected-data item identifier includes data of multiple time points, the to-be-reported data may include time information of the multiple time points and data information of multiple pieces of data corresponding to the multiple time points.

The one or more groups of attribute information included in the data attribute item definitely identify only one collected data item. It may be determined, based on the data attribute item, that electricity meter data other than an event is reported in the DLMS extension event packet. The data attribute item (the field 2') shown in FIG. 5 includes three groups of attribute information defined in a DLMS standard, that is, includes a field 21, a field 22, and a field 23. An example in which a smart meter is an electricity meter is still used for description. Different collected data items, for example, data items that do not need to be collected in real time, such as total active power, a historical power on/off record, and daily frozen total positive active energy, need to be uniquely identified by using a data attribute item that includes different quantities of attribute information. For example, a data attribute item of the total active power data item needs to be described by using only one group of attribute information, and a data attribute item of the daily frozen total positive active energy data item needs to be described by using three groups of attribute information.

An example in which the collected data item in FIG. 5 is the daily frozen total positive active energy data item is used for description. The data attribute item of the daily frozen total positive active energy data item needs to be described by using three groups of attribute information. When to-be-reported packet data is generated, the data attribute item of the daily frozen total positive active energy data item is the field 21, the field 22, and the field 23, for example, AttrInfo1=03 (ClassID)+01 00 01 08 00 *FF* (InstanceID)+02 (AttrID), AttrInfo2=07 (ClassID)+01 00 80 63 09 *FF* (InstanceID)+02 (AttrID), AttrInfo3=08 (ClassID)+00 00 01 00 00 *FF* (InstanceID)+02 (AttrID).

The collector generates the packet data that includes the data attribute item that is described by using three groups of attribute information and that corresponds to the daily frozen total positive active energy data item and the to-be-reported data that are shown in FIG. 5.

Figure 6:
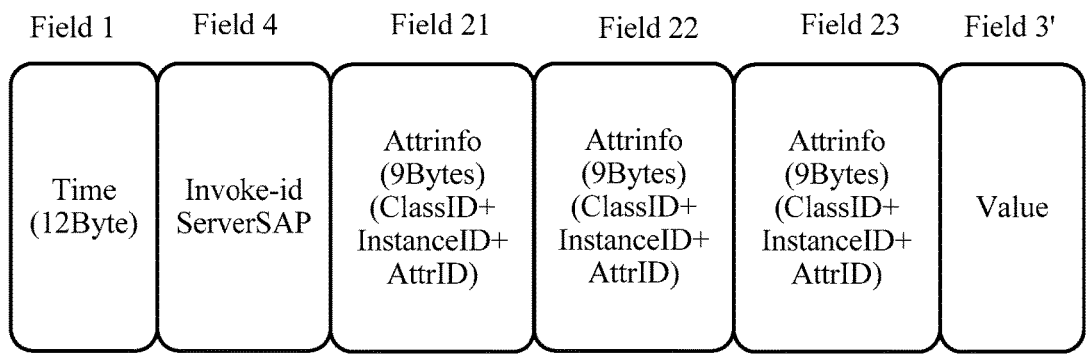
FIG. 6 is a schematic diagram of another format of a DLMS extension event packet according to an embodiment of the present invention.

Optionally, FIG. 6 is a schematic diagram of another format of a DLMS extension event packet according to an embodiment of the present invention. On the basis of the packet format shown in FIG. 5, a field 4 is further included. The field 4 includes a reporting confirmation instruction, and the reporting confirmation instruction is used to instruct the master station to feed back, after receiving the to-be-reported data, confirmation information indicating that the to-be-reported data is successfully received. In this way, it can be ensured that the master station reliably receives the to-be-reported data corresponding to the collected-data item identifier. The field 4 may further include identification information of a smart meter that reports data, and the identification information of the smart meter that reports data indicates a smart meter from which data is transmitted. In this way, a smart meter from which data is transmitted can be easily confirmed. Optionally, the field 4 may further include both the reporting confirmation instruction and the identification information of the smart meter that reports data. Optionally, although not shown in the figure, the field 4 may further include a quantity of groups of attribute information included in a data attribute item that describes a collected data item.

After generating a DLMS extension event packet, the collector sends the generated DLMS extension event packet to the master station. The collector may first establish a connection to the master station based on the DLMS protocol, and then report the generated DLMS extension event packet to the master station. The connection established by the collector to the master station may be a persistent connection, or may be a short connection. Specifically, the collector actively requests, based on the DLMS protocol, to establish the connection to the master station, and the master station responds to the request of the collector to establish the connection. The collector sends generated DLMS extension event packet to the master station. Herein, a step of generating the DLMS extension event packet data is performed before the collector establishes the connection to the master station, but this constitutes no limitation. Alternatively, the step may be performed after the collector establishes the connection to the master station, or may be performed when the collector establishes the connection to the master station.

Figure 7:
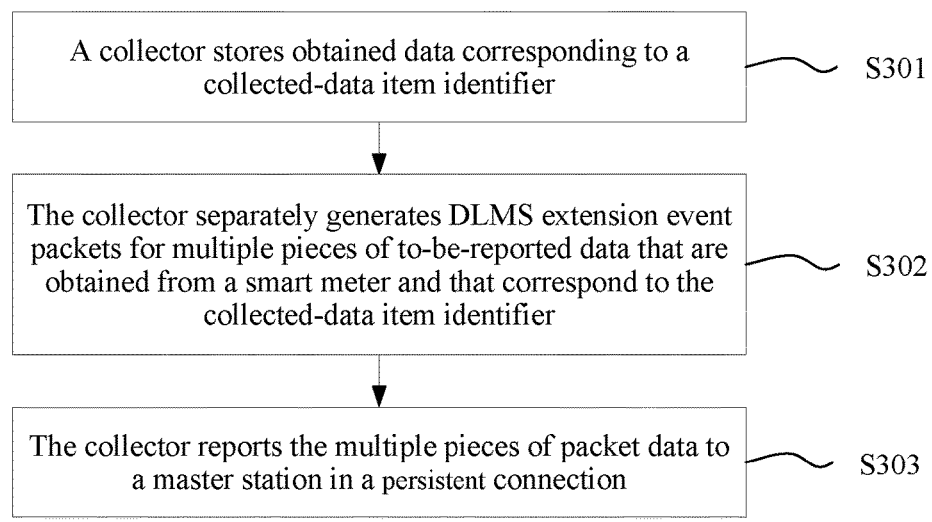
FIG. 7 is a schematic flowchart of reporting multiple pieces of to-be-reported data by a collector according to an embodiment of the present invention.

Optionally, there may be multiple pieces of to-be-reported data corresponding to the collected-data item identifier delivered by the master station. Therefore, when reporting, in an event reporting manner, the to-be-reported data corresponding to the collected-data item identifier, the collector may simultaneously report, to the master station in a persistent connection in an event reporting manner, the multiple pieces of data that are obtained from the smart meter and that correspond to the collected-data item identifier. FIG. 7 is a schematic flowchart of reporting multiple pieces of to-be-reported data by a collector according to an embodiment of the present invention. As shown in step S301, a collector stores obtained data corresponding to a collected-data item identifier. As shown in step S302, the collector separately generates DLMS extension event packets for multiple pieces of to-be-reported data that are obtained from a smart meter and that correspond to the collected-data item identifier. In step S303, the collector reports the foregoing multiple pieces of packet data to a master station in a persistent connection. Afterwards, the persistent connection between the collector and the master station may be broken. Optionally, the collector may store multiple pieces of to-be-reported data that are obtained from one smart meter and that correspond to a collected-data item identifier, separately generate DLMS extension event packets, and report the generated multiple DLMS extension event packets to the master station in a persistent connection actively established by the collector to the master station. Optionally, the collector may store to-be-reported data that is obtained from multiple smart meters and that corresponds to a collected-data item identifier, separately generate DLMS extension event packets, and report the generated multiple pieces of DLMS extension event packet data to the master station in a persistent connection actively established by the collector to the master station.

Herein, when the collector simultaneously sends the multiple DLMS extension event packets by using the persistent connection, a moment at which the collector sends the packets to the master station is not specifically limited, and may be a moment following a time interval, a specified moment, a moment at which a preset amount of data or all data corresponding to the collected-data item identifier is stored, or the like.

The DLMS extension event packets are separately generated for the multiple pieces of to-be-reported data corresponding to the collected-data item identifier, and are sent to the master station in a persistent connection. Therefore, a quantity of times of establishing a connection established between the collector and the master station can be reduced, wireless network traffic can be reduced, and a waste of wireless network resources can be reduced.

According to the data collection method in this embodiment of the present invention, a master station does not need to send, by using a collector, an instruction to a smart meter to establish a connection for each operation of each smart meter. Therefore, a quantity of times of communication between the master station and the collector is reduced. In this way, wireless network traffic is reduced, network occupied resources is reduced, and data collection performance is improved.

The data collection method is described above. The foregoing specific description is only an example, and is not specifically limited. A data collection apparatus according to an embodiment of the present invention is described below in detail with reference to FIG. 8 and FIG. 9.

Figure 8:
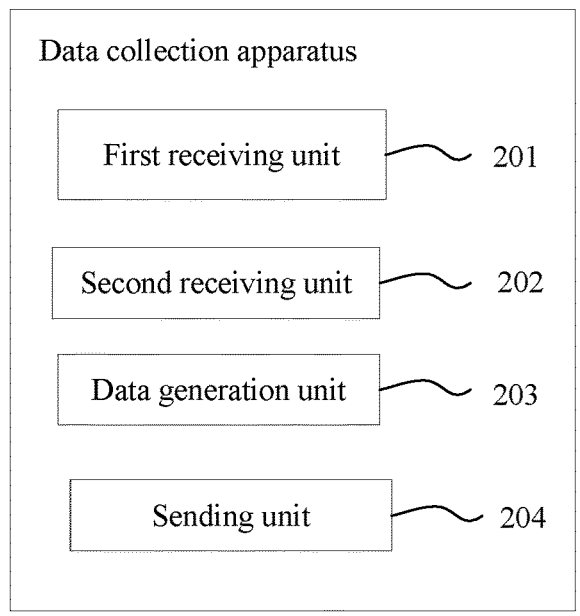
FIG. 8 is a schematic block diagram of a data collection apparatus according to an embodiment of the present invention.

FIG. 8 is a schematic block diagram of a data collection apparatus according to an embodiment of the present invention. As shown in FIG. 8, the data collection apparatus communicates with a master station by using the Distribution Line Message Specification (DLMS) protocol, and the data collection apparatus includes: a first receiving unit 201, a second receiving unit 202, a data generation unit 203, and a sending unit 204. The first receiving unit 201 is configured to obtain a collected-data item identifier from the master station, and the collected-data item identifier indicates a collected data item that needs to be reported to the master station in an event reporting manner, that is, the first receiving unit 201 performs step S10 in FIG. 2. The second receiving unit 202 is configured to obtain, from a smart meter, to-be-reported data corresponding to the collected-data item identifier, that is, performs step S20. The data generation unit 203 is configured to generate a DLMS extension event packet, the DLMS extension event packet includes a data attribute item and the to-be-reported data, and the data attribute item is used to identify a type of the to-be-reported data, that is, the data generation unit 203 performs step S30. The sending unit 204 is configured to send the DLMS extension event packet to the master station, that is, performs S40.

In this embodiment, the first receiving unit 201 responds to a connection establishment request of the master station to establish a connection to the master station, and receives the collected-data item identifier delivered by the master station. Afterwards, the connection between the data collection apparatus and the master station is broken. The data collection apparatus establishes a connection to the smart meter, and delivers the collected-data item identifier to the smart meter. The smart meter sends the to-be-reported data corresponding to the collected-data item identifier to the collector. Optionally, the data collection apparatus may report, in an event reporting manner, the to-be-reported data corresponding to the collected-data item identifier to the collector.

Figure 9:
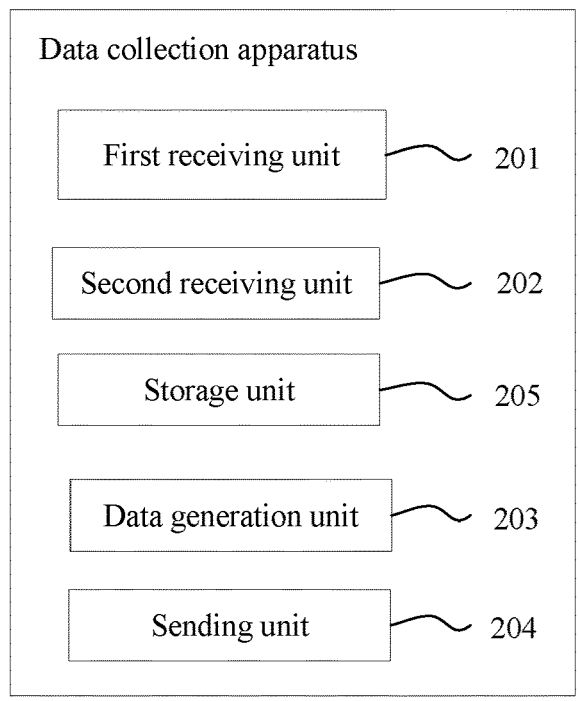
FIG. 9 is a schematic block diagram of another data collection apparatus according to an embodiment of the present invention.

Optionally, FIG. 9 is a schematic block diagram of another data collection apparatus according to an embodiment of the present invention. On the basis of the data collection apparatus in FIG. 8, a storage unit 205 is further included. There may be multiple pieces of to-be-reported data corresponding to a collected-data item identifier delivered by a master station. When receiving the to-be-reported data corresponding to the collected-data item identifier, the data collection apparatus may store the to-be-reported data in the storage unit 205, and simultaneously report, to the master station in a persistent connection in an event reporting manner, the multiple pieces of to-be-reported data that are obtained from a smart meter and that correspond to the collected-data item identifier.

In this embodiment, a data attribute item includes one or more groups of attribute information, and the attribute information is attribute information defined in a DLMS standard.

In this embodiment, a DLMS extension event packet further includes a reporting confirmation instruction, and the reporting confirmation instruction is used to instruct the master station to feed back a confirmation message after successfully receiving the to-be-reported data. In this way, it can be ensured that the master station reliably receives the to-be-reported data corresponding to the collected-data item identifier.

In this embodiment, the DLMS extension event packet further includes identification information of a smart meter, and the identification information of the smart meter indicates a smart meter that reports the to-be-reported data. In this way, a smart meter from which data is transmitted can be easily confirmed.

In this embodiment, the DLMS extension event packet further includes a quantity of groups of attribute information. In this way, the master station can easily read a data attribute item.

In this embodiment, the sending unit actively establishes a connection to the master station when sending the DLMS extension event packet to the master station.

In this embodiment, the connection established by the collector to the master station is a persistent connection, and the collector sends multiple DLMS extension event packets to the master station in the persistent connection. In this way, a quantity of times of establishing a connection between the master station and the collector in a data collection process can be reduced, occupied resources can be reduced, and data collection performance can be improved.

To avoid unnecessary repetition, related details such as the DLMS extension event packet are not repeatedly described herein. For details, refer to the content described with reference to FIG. 1 to FIG. 7.

According to the data collection apparatus, a collected-data item identifier delivered by a master station is received, so that to-be-reported data that is obtained from a smart meter and that corresponds to the collected-data item identifier is reported in an event reporting manner. In this way, connection message exchange between the master station and the data collection apparatus in a data collection process can be reduced, resources required by connection maintenance can be reduced, and data collection performance can be improved.

Figure 10:
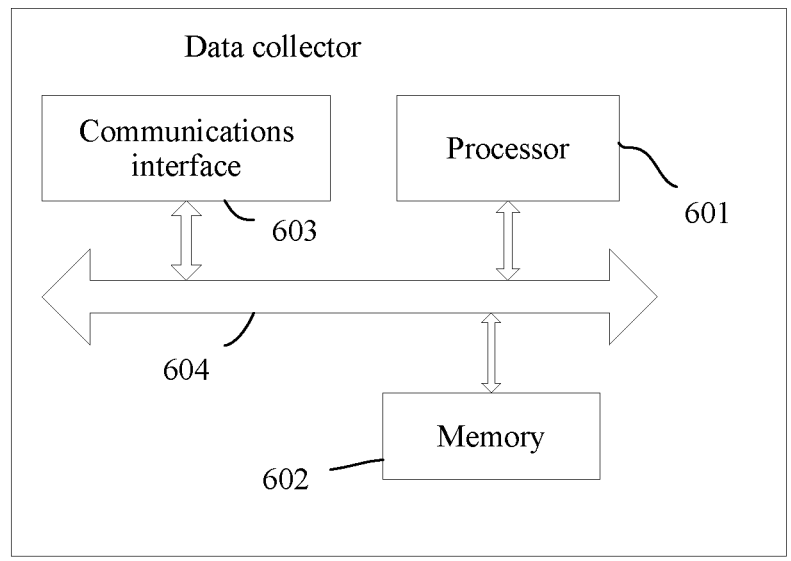
FIG. 10 is a schematic block diagram of a data collector according to an embodiment of the present invention.

A specific implementation of the present invention further provides a data collector. FIG. 10 is a schematic block diagram of a data collector according to an embodiment of the present invention. As shown in FIG. 10, a data collector 600 includes: a processor 601, a memory 602, a communications interface 603, and a bus 604.

The processor 601, the memory 602, and the communications interface 603 are mutually connected by using the bus 604. The bus 604 may be a Peripheral Component Interconnect (PCI) bus, an extended industry standard architecture (EISA) bus, or the like. The bus may be classified into an address bus, a data bus, a control bus, and the like. For ease of representation, only one bold line is used in FIG. 10 to represent the bus. However, this does not mean that there is only one bus or only one type of bus.

The processor 601 may be a central processing unit (CPU) or a combination of a CPU and a network processor (NP).

The processor 601 may further be a hardware chip, and the hardware chip may be an application-specific integrated circuit (ASIC), a programmable logic device (PLD), or a combination thereof. The foregoing PLD may be a complex programmable logic device (CPLD), a field-programmable gate array (FPGA), a generic array logic (GAL), or any combination thereof.

The memory 602 may include a volatile memory such as a random access memory (RAM). Alternatively, the memory 602 may include a non-volatile memory such as a flash memory, a hard disk drive (HDD), or a solid state drive (SSD). Alternatively, the memory 602 may include a combination of the foregoing types of memories.

The memory 602 may be configured to store program instructions. The processor 601 may execute the program instructions stored in the memory 602 to perform one or more steps or optional implementations in the embodiment shown in FIG. 2, so that the foregoing data collector 600 performs a data collection action in the foregoing method.

The communications interface 603 may be a wired communications interface, a wireless communications interface, or a combination thereof. The wired communications interface may be, for example, an Ethernet interface. The Ethernet interface may be an optical interface, an electrical interface, or a combination thereof. The wireless communications interface may be a wireless local area network (WLAN) interface, a cellular network communications interface, or a combination thereof.

Figure 11:
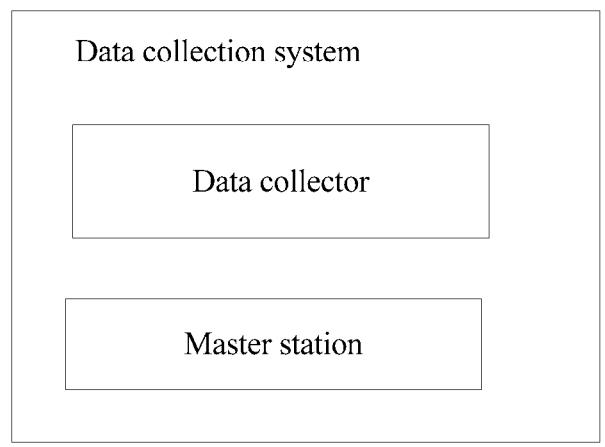
FIG. 11 is a schematic block diagram of a data collection system according to an embodiment of the present invention.

FIG. 11 is a block diagram of a data collection system 1000 according to an embodiment of the present invention. The data collection system 1000 includes the foregoing data collector and a master station. The data collector and the master station may use the foregoing data collection method.

In addition, an embodiment of the present invention provides a storage medium, the storage medium is configured to store a computer program, and when the computer program is executed by a processor, the processor implements the foregoing data collection method and any optional method thereof. Specifically, the computer program may include one or more program units configured to implement the steps in the method.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separated, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units may be integrated into one unit. The integrated unit may be implemented in a form of hardware, or may be implemented in a form of a software functional unit.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

Additionally, statements made herein characterizing the invention refer to an embodiment of the invention and not necessarily all embodiments.

What is claimed is:

1. A data collection method for a collector that communicates with a master station by using the Distribution Line Message Specification (DLMS) protocol, the method comprising:
    obtaining, by the collector, a collected-data item identifier from the master station, wherein the collected-data item identifier indicates a collected data item that is to be reported to the master station;
    obtaining, by the collector, from a smart meter, to-be-reported data corresponding to the collected-data item identifier;
    generating, by the collector, a DLMS extension event packet, wherein the DLMS extension event packet comprises a data attribute item and the to-be-reported data, and the data attribute item is used to identify a type of the to-be-reported data; and
    sending, by the collector, the DLMS extension event packet to the master station;
    wherein the collector actively establishes a connection to the master station when sending the DLMS extension event packet to the master station.

2. The method according to claim 1, wherein the data attribute item comprises one or more groups of attribute information, and the attribute information is attribute information defined in the DLMS standard.

3. The method according to claim 1, wherein the DLMS extension event packet further comprises a reporting confirmation instruction, and the reporting confirmation instruction is used to instruct the master station to feed back a confirmation message after successfully receiving the to-be-reported data.

4. The method according to claim 1, wherein:
    the connection established by the collector to the master station is a persistent connection; and
    the collector sends multiple DLMS extension event packets to the master station in the persistent connection.

5. A data collector for communicating with a master station by using the Distribution Line Message Specification (DLMS) protocol, the data collector comprising:
    a processor and a memory storing processor-executable instructions, the processor being configured to execute the processor-executable instructions to facilitate performance of the following:
    obtaining a collected-data item identifier from the master station, wherein the collected-data item identifier indicates a collected data item that is to be reported to the master station;
    obtaining from a smart meter, to-be-reported data corresponding to the collected-data item identifier;
    generating a DLMS extension event packet, wherein the DLMS extension event packet comprises a data attribute item and the to-be-reported data, and the data attribute item is for identifying a type of the to-be-reported data; and
    sending the DLMS extension event packet to the master station;
    wherein the processor is further configured to execute the processor-executable instructions to facilitate: actively establishing a connection to the master station when sending the DLMS extension event packet to the master station.

6. The data collector according to claim 5, wherein the connection to the master station is a persistent connection; and wherein the processor is further configured to execute the processor-executable instructions to facilitate:
    sending multiple DLMS extension event packets to the master station in the persistent connection.

7. The data collector according to claim 5, wherein the data attribute item comprises one or more groups of attribute information, and the attribute information is attribute information defined in the DLMS standard.

8. The data collector according to claim 5, wherein the DLMS extension event packet further comprises a reporting confirmation instruction, and the reporting confirmation instruction is for instructing the master station to feed back a confirmation message after successfully receiving the to-be-reported data.

9. A system comprising:
a data collector; and
a master station;
wherein the data collector and the master station are configured to communicate by using the Distribution Line Message Specification (DLMS) protocol;
wherein the data collector is configured to:
    obtain a collected-data item identifier from the master station, wherein the collected-data item identifier indicates a collected data item that is to be reported to the master station;
    obtain, from a smart meter, to-be-reported data corresponding to the collected-data item identifier;
    generate a DLMS extension event packet, wherein the DLMS extension event packet comprises a data attribute item and the to-be-reported data, and the data attribute item is for identifying a type of the to-be-reported data; and
    send the DLMS extension event packet to the master station;
wherein the data collector is further configured to actively establish a connection to the master station when sending the DLMS extension event packet to the master station.

10. The system according to claim 9, wherein the data attribute item comprises one or more groups of attribute information, and the attribute information is attribute information defined in the DLMS standard.

11. The system according to claim 9, wherein the DLMS extension event packet further comprises a reporting confirmation instruction, and the reporting confirmation instruction is for instructing the master station to feed back a confirmation message after successfully receiving the to-be-reported data.

12. The system according to claim 9, wherein the connection to the master station is a persistent connection; and wherein the data collector is further configured to send multiple DLMS extension event packets to the master station in the persistent connection.

* * * * *